United States Patent
Marinet

(10) Patent No.: US 8,719,666 B2
(45) Date of Patent: May 6, 2014

(54) KEY EXTRACTION IN AN INTEGRATED CIRCUIT

(75) Inventor: Fabrice Marinet, Chateauneuf le Rouge (FR)

(73) Assignee: STMicroelectronics (Rousset) SAS, Rousset (FR)

(*) Notice: Subject to any disclaimer, the term of this patent is extended or adjusted under 35 U.S.C. 154(b) by 277 days.

(21) Appl. No.: 13/220,453

(22) Filed: Aug. 29, 2011

(65) Prior Publication Data
US 2012/0066571 A1    Mar. 15, 2012

(30) Foreign Application Priority Data
Aug. 31, 2010   (FR) ..................... 10 56886

(51) Int. Cl.
*G11C 29/00*   (2006.01)

(52) U.S. Cl.
USPC ........................................... 714/769

(58) Field of Classification Search
USPC ............ 714/48, 746, 768–769, 773; 713/194
See application file for complete search history.

(56) References Cited

U.S. PATENT DOCUMENTS

| | | | |
|---|---|---|---|
| 7,702,927 B2* | 4/2010 | Devadas et al. | 713/194 |
| 8,468,186 B2* | 6/2013 | Yu | 708/250 |
| 2003/0204743 A1 | 10/2003 | Devadas et al. | |
| 2006/0210082 A1 | 9/2006 | Devadas et al. | |
| 2012/0179952 A1* | 7/2012 | Tuyls et al. | 714/768 |

FOREIGN PATENT DOCUMENTS

| | | |
|---|---|---|
| EP | 2081170 A1 | 7/2009 |
| WO | WO 01/06511 A1 | 1/2001 |
| WO | WO 01/93035 A2 | 12/2001 |
| WO | WO 2007119190 A2 | 10/2007 |
| WO | WO 2009024913 A2 | 2/2009 |
| WO | WO 2009024913 A9 | 2/2009 |
| WO | WO 2009128044 A1 | 10/2009 |

OTHER PUBLICATIONS

Yu et al., Secure and robust error correction for physical unclonable functions, 2010, IEEE design & test of computers, p. 48-64.*
Nigle Smart, ECRYPT II: European network of excellence in cryptology II, Aug. 1, 2008, Network of excellence information & communication technology, p. 1 to 106, retrieved from Google Jul. 25, 2013.*
Blaise Gassend, Physical random functions, Feb. 2003, Computer science & Artifical intelligence lab, MIT, p. 1-91, retrieved from Google Jul. 25, 2013.*
French Search Report and Written Opinion dated Jun. 27, 2011from corresponding French Application No. FR/10/56886.
Halderman, J.A., *Lest We Remember: Cold Boot Attacks on Encryption Keys*, USENIX Association, 17 USENIX Security Symposium, San Jose, CA, Jul. 2008, pp. 45-60, XP007910951.
Holcomb D.E., Power-up SRAM State as an Identifying Fingerprint and Source of True Random Numbers, IEEE Transactions o Computers, Vo.. 57, No. 11, Nov. 2008, pp. 1-14, XP007918251.

* cited by examiner

*Primary Examiner* — Shelly A Chase
(74) *Attorney, Agent, or Firm* — Wolf, Greenfield & Sacks, P.C.

(57) ABSTRACT

A method of extraction of a key from a physical unclonable function using the states of cells of a volatile memory after a powering on, wherein: cells are read according to addresses stored in a non-volatile memory; an error-correction code corrects the read states; and, in case an error has been corrected, the address of the cell providing an erroneous state is replaced in the non-volatile memory with that of another cell providing the non-erroneous state.

15 Claims, 3 Drawing Sheets

KEY EXTRACTION IN AN INTEGRATED CIRCUIT

CROSS REFERENCE TO RELATED APPLICATIONS

This application claims the priority benefit of French patent application Ser. No. 10/56886, filed on Aug. 31, 2010, entitled KEY EXTRACTION IN AN INTEGRATED CIRCUIT, which is hereby incorporated by reference to the maximum extent allowable by law.

BACKGROUND OF THE INVENTION

1. Field of the Invention

The present invention generally relates to electronic circuits, and more specifically to circuits implementing cryptographic processes requiring the storage of identification or authentication keys.

The present invention more specifically applies to the generation of one or several keys in an integrated circuit.

2. Discussion of the Related Art

Many applications involve keys used in encryption algorithms or, more simply, integrated circuit identification keys. These may be keys used in exchanges with other circuits of the same product or of a distant product, authentication keys used to guarantee the origin of an integrated circuit, product identification keys, or any encryption or signature key. Most often, keys are derived from a main or master key to decrease risks of discovery of the master key.

The keys (including the master key) are generally recorded in a non-volatile memory of the integrated circuit and are read on demand. However, the simple fact that a key is contained in a non-volatile memory puts it at risk to be hacked.

To avoid storing a key in the non-volatile memory, a solution is to extract this key from a physical unclonable function (PUF). Such a method comprises causing the extraction of the key based on physical characteristics intrinsic to the integrated circuit, which are linked to its manufacturing. The data extracted to obtain the key are reproducible for a same circuit, but different from one circuit to another with a sufficient dispersion to be able to generate different keys. The physical characteristics on which the obtaining of the key is based may be of different natures. The unclonability results from the fact that the physical characteristics used vary from one circuit to the other according to the random dispersions during the circuit manufacturing process and are not controllable during the manufacturing either. The secret key is thus extremely difficult to hack. Further, in case of reverse engineering, either the cloned circuit will not be able to provide the same key, or an intrusive read attempt will modify the key.

Embodiments more specifically apply to a physical unclonable function which uses the state of cells of a volatile memory after powering-on of this memory. This phenomenon uses, as a physical parameter, mainly the threshold voltages of the transistors forming each cell and the dispersions between these threshold voltages. To a lesser extent, the saturation currents of the transistors also have an influence.

In operation, the programming of the memory cells forces state 0 or 1 of the cell. However, on powering-on of the memory plane (for example, after resetting of the product), each cell sets to a state 0 or 1 according to the imbalance between the threshold voltages of the transistors of this cell.

The reproducibility of the states of the cells of a memory in successive power-on operations is not the same for all the cells of such a memory. This usually leads to equipping the key extraction circuits with complex error correction codes to ensure the reproducibility of the extracted key according to error rates assigned to each cell.

Further, the state provided by a cell as it is powered on may vary over the lifetime of the product.

SUMMARY OF THE INVENTION

An embodiment overcomes all or part of the disadvantages of physical unclonable functions based on the use of volatile memories.

According to a first aspect, an embodiment improves the reproducibility of extractions to use a simpler error-correction code.

According to a second aspect, an embodiment provides a solution to the problem of the time variation of the states provided by the cells.

To achieve all or part of these and other objects, embodiments provide a method of extraction of a key from a physical unclonable function using the states of cells of a volatile memory following a powering-on of this memory, wherein:

cells are read according to addresses stored in a non-volatile memory;

an error-correction code corrects the read states; and in case an error has been corrected, the address of the cell providing an erroneous state is replaced, in the non-volatile memory, with that of another cell providing the non-erroneous state.

According to an embodiment, the states extracted from the volatile memory are submitted to a mask to provide the key.

According to an embodiment, the addresses are initially determined based on successive tests of the states provided by the memory cells to select stable cells.

According to an embodiment, the cells providing said states are selected from a set of cells formed after a test phase in which successive readings from the memory are performed after successive power-on operations, the set comprising the cells having provided same states during these read operations.

According to an embodiment, the addresses of the cells of the set are stored in a non-volatile memory.

According to an embodiment, the set excludes bits at the periphery of the memory plane.

An integrated circuit comprising means capable of implementing this method is also provided.

The foregoing and other objects, features, and advantages will be discussed in detail in the following non-limiting description of specific embodiments in connection with the accompanying drawings.

DETAILED DESCRIPTION

Figure 1:
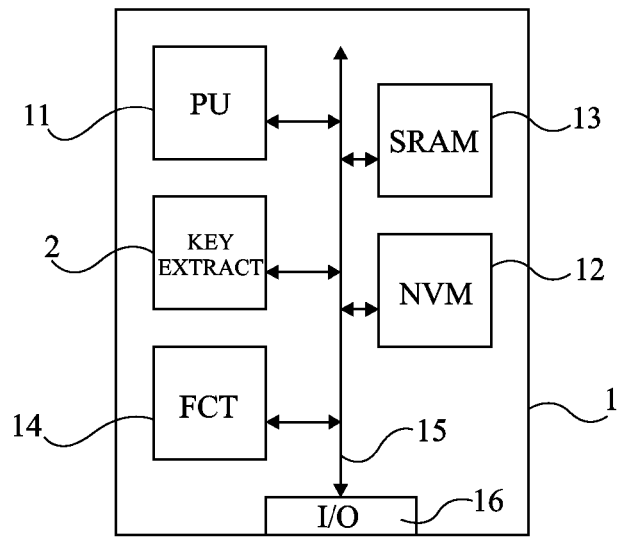
FIG. 1 very schematically shows, in the form of blocks, an embodiment of an integrated circuit of the type to which the embodiments apply as an example.

The same elements have been designated with the same reference numerals in the different drawings. For clarity, only those steps and elements which are useful to the understanding of the embodiments have been shown and will be described. In particular, what to use is made by the integrated circuit of the key extracted from the physical unclonable function has not been detailed, embodiments being compatible with current uses of such keys. Further, the mechanisms of resetting and reading of the cells of a volatile memory have not been detailed either, embodiments being here again compatible with the different usual volatile memories.

FIG. 1 shows a block diagram of an embodiment of an integrated circuit.

Such a circuit 1 comprises a processing unit 11 (PU), various memories, including at least one non-volatile memory 12 (NVM) and one volatile memory 13 (SRAM), a unit 2 (KEY EXTRACT) for extracting or generating at least one key from a physical unclonable memory and various other components according to the application for which circuit 1 is intended, for example, logic circuits or a ROM containing a program executed by the processing unit. These various components have been illustrated by a function block 14 (FCT).

The different blocks of circuit 1 communicate together over one or several address, data, and control buses 15. Various shared or dedicated bus configurations between blocks may be provided. Circuit 1 is further capable of communicating with the outside through an input/output interface 16 (I/O).

Figure 2:
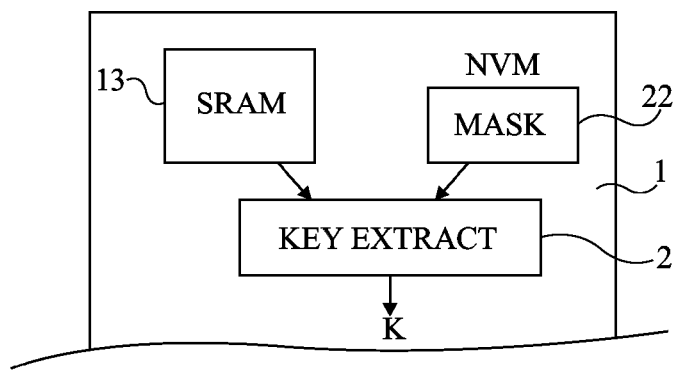
FIG. 2 is a block diagram illustrating the extraction of a key from the volatile memory of the circuit of FIG. 1.

FIG. 2 is a partial block diagram of circuit 1 illustrating the circuits involved in the extraction of a key K. The state of the cells of volatile memory 13 after a powering-on of this memory (for example, after a resetting) as well as a mask 22 for selecting and/or combining these cells are used. Mask 22 is, for example, stored in non-volatile memory NVM and is specific to the integrated circuit. The mask and the states of the volatile memory are used by key extraction circuit 2 which implements an error-correction code as well as the selection of the states according to the mask.

Figure 3:
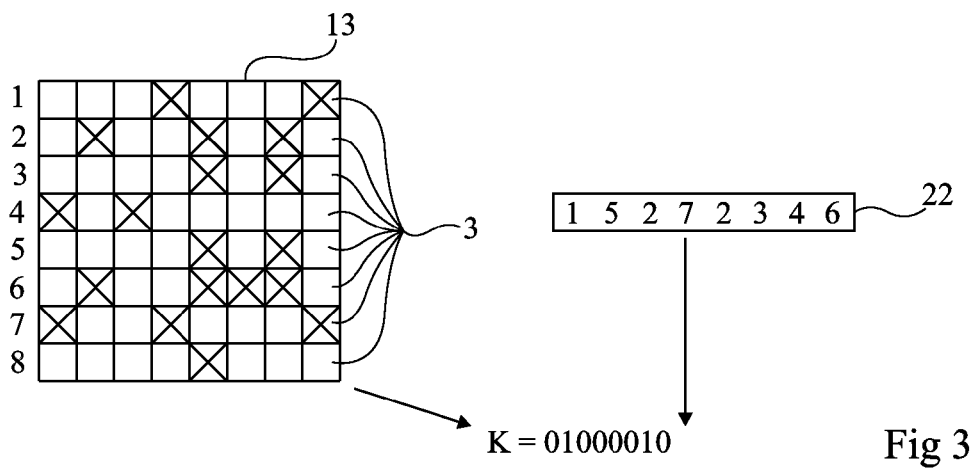
FIG. 3 illustrates the operation of the circuit of FIG. 2.

FIG. 3 illustrates in very simplified fashion the operation of a physical unclonable function of the type in FIG. 2.

Assume the use of 8 bytes of memory 13. In FIG. 3, the respective cell states have been illustrated by an empty box for a first state (for example, 0) and a cross for a second state (for example, 1). Mask 22 is formed of a byte identifying a column in each line of the memory to extract a bit. For example, key K is formed, for successive lines 1 to 8 of memory 13, of the states of the cells of the first, fifth, second, seventh, second, third, fourth, and sixth columns. This provides a key K of value 01000010. This is a very simplified example.

Key K is only stored in volatile fashion (in registers or in memory 13, so that it disappears at each turning-off or resetting of circuit 1).

In certain applications, it is desired to decide the value to be given to the key. In this case, the mask is selected so that its combination with the bits originating from the memory plane provides the desired key. An additional mask may derive a key to be used from the generated key.

From one integrated circuit to the other, the distribution of the cells having one state or another after a reset is very close to equiprobability due to the structure of the SRAM point.

It should be noted that the fact for a third circuit to know the mask does not allow it to restore the key since, even if the circuit is reproduced by reverse engineering, the memory states following a reset cannot be reproduced. Accordingly, the mask may as a variation originate from outside of the circuit.

Figure 4:
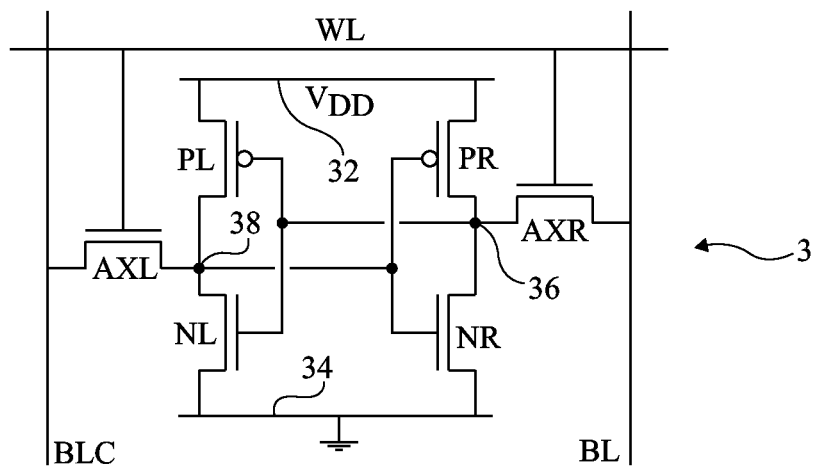
FIG. 4 shows an example of an SRAM-type memory cell.

FIG. 4 shows an example of an SRAM-type memory cell 3 capable of being used in memory 13.

In this example, it is a cell with six transistors. This cell 3 comprises, between two lines 32 and 34 of application of a power supply voltage $V_{DD}$, two parallel branches each comprising a P-channel MOS transistor PL, PR in series with an N-channel MOS transistor NL, NR. The gates of the transistors of left-hand branch L are connected to junction point 36 of the transistors of right-hand branch R. The gates of the transistors of the right-hand branch are connected to junction point 38 of the transistors of the left-hand branch. Nodes 36 and 38 respectively provide the cell state and its inverse (complement to one). Nodes 36 and 38 are connected to bit lines BL and BLC by selection transistors AXL and AXR, respectively. The gates of the selection transistors are connected to a word line WL. The operation of a cell such as illustrated in FIG. 3 is usual.

The described embodiments use the fact that the threshold voltages of the transistors of each branch are not strictly identical due to technological dispersions at the manufacturing. This phenomenon is not disturbing in the memory operation since, it being a volatile memory, the states are necessarily programmed before being read and used.

The physical unclonable function takes advantage from the fact that, at the powering-on (application of voltage $V_{DD}$ to the memory plane), the states of nodes 36 and 38 will depend on the relation between the threshold voltages of transistors NL, NR, PL, and PR. For example, assuming for simplification that transistors PL and PR have identical threshold voltages, if the threshold voltage of transistor NR is lower than that of transistor NL, the cell state will stabilize with a low state (0) at node 36 and a high state (1) at node 38. Conversely, if the threshold voltage of transistor NL is lower than that of transistor NR, node 36 will have a high state and node 38 will have a low state.

The image of the memory plane after reset and before programming will thus be different from one circuit to another.

However, the reproducibility of the state of a cell at each resetting depends on how different the threshold voltages of its transistors are from one another. Indeed, the smaller this difference, the less stable the cell is, that is, along time, the direction of the difference between threshold voltages risks to reverse. It can thus be seen that, in a memory plane, some cells are stable (good reproducibility of the state at each resetting), others are fairly stable, and others are unstable. Because of this, an error-correction code has to be used in the key extraction circuit.

Other types of cells may also be used. The described embodiments apply as soon as the state of each cell after powering-on or reset depends on a difference between the conduction thresholds of the transistors of this cell.

Figure 5:
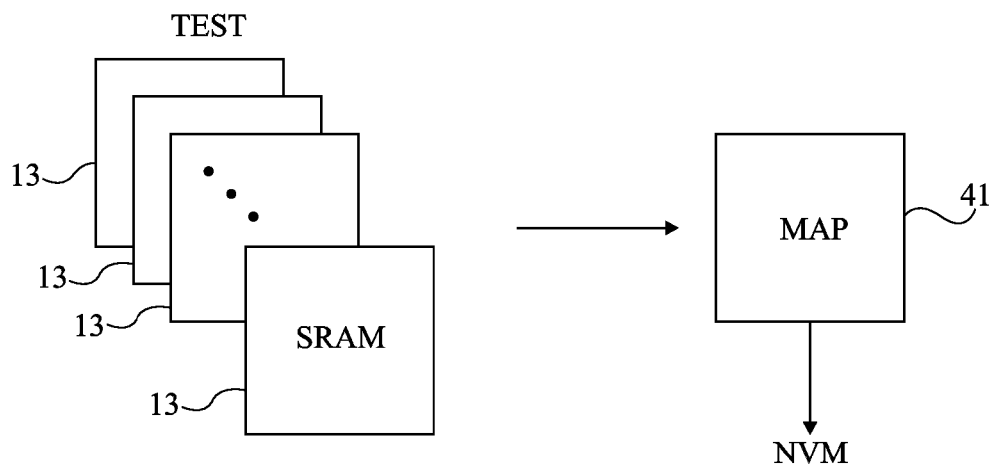
FIG. 5 is a block diagram illustrating a first aspect.

FIG. 5 is a block diagram of a preparatory phase of a first aspect of the method of key extraction, from a physical unclonable function based on the use of an SRAM-type memory.

It is provided to preselect the memory cells to be taken into account from among the cells considered as the most stable. To achieve this, in a preparatory phase, several successive resettings of memory 13 are performed (TEST). A map 41 (MAP) of the memory in which the most stable cells are identified is deduced therefrom. This map is stored in non-volatile memory 12 of the integrated circuit, to be used later in extractions of the key from the memory.

The above operations are performed at the end of the integrated circuit manufacturing (FAB) or during an initialization process (INIT), in a customization phase, etc. This phase may also be carried out on a memory area still unused by an application during the lifetime of the product for a storage of new keys or to select new stable bits.

Figure 6:
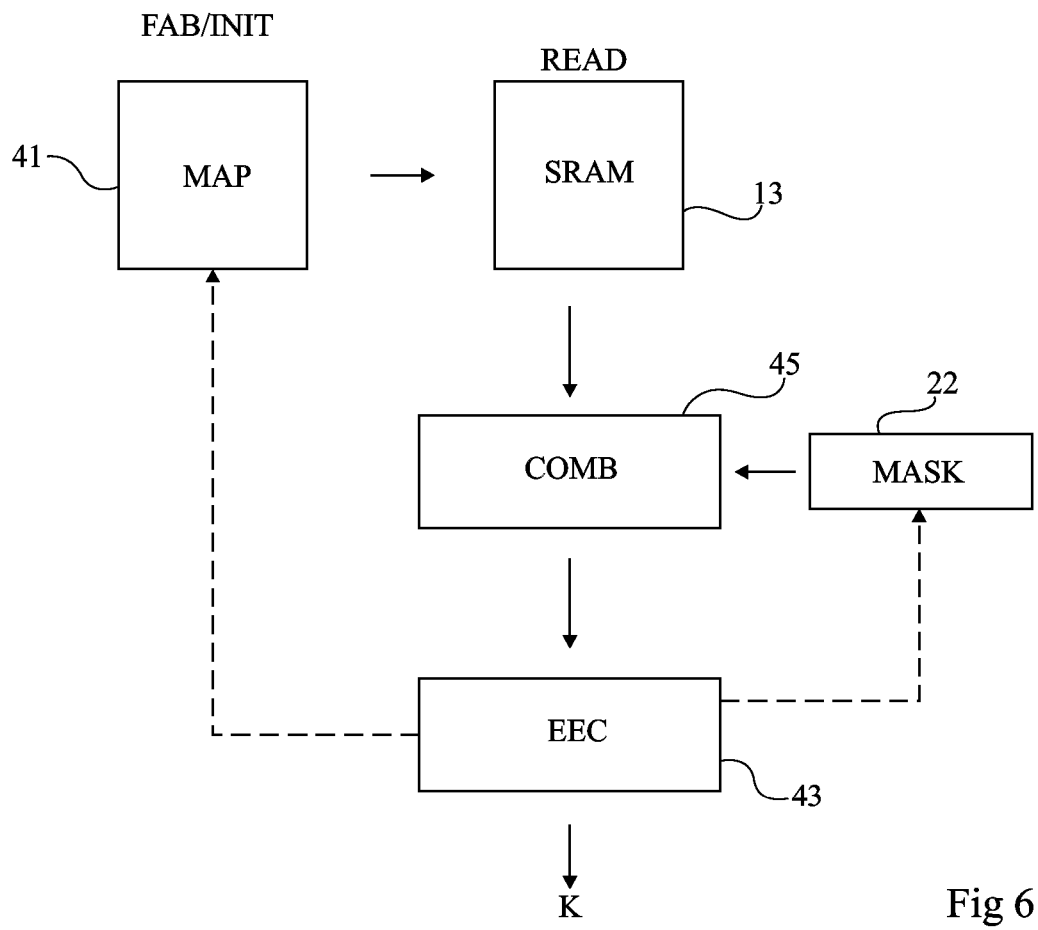
FIG. 6 is a block diagram illustrating an implementation mode of the key extraction method.

FIG. 6 very schematically illustrates in the form of blocks an embodiment of a key extraction when the circuit is being used.

Each time the circuit is reset, a reading (READ) from memory plane 13 is performed according to map 41. In other words, only the cells selected by the map are read from. As a variation, all cells are read from and only those identified by the mapping are submitted to the rest of the processing, that is, selectable by the mask.

The result of the reading is used by a function 45 (COMB) of combination or selection m with mask 22. The result of the combination is submitted to an error-correction code 43 (EEC). This error-correction code aims at correcting potentially erroneous states. Any error-correction code may be used. The result provided by the error-correction code provides key K. The error-correction code is stored in the non-volatile memory.

Since a previous selection of a set of memory cells or bits has been performed based on these tests (FIG. 5), the error-correction code used may be simplified, and the read operations will generate much less errors than usual solutions.

As a variation, the error-correction code is implemented before the combination, but it is then also slightly more complex due to the number of verified bits, however remaining simplified due to the improved stability of the bits.

The number of tests to be performed to improve map 41 especially depends on the error-correction code, that is, on the number of errors that it is capable of correcting. The larger the number of tests, the more the determination of the stable cells will be reliable and the simpler the error-correction may be. As a specific embodiment, the number of tests ranges between 10 and 500, preferably approximately 100. Since this determination is in principle only made once, some time may be dedicated to it.

According to an alternative embodiment, the series of tests (FIG. 5) is carried out after a biasing of the entire memory plane to a same state. This biasing may slightly shift the threshold voltages of the cells and thus their initialization values when said voltages are close to instability. The longer the cells are biased, the more the transistors risk seeing their threshold voltage change in one direction. This makes some bits switch to the opposite state. This enables eliminating bits close to the unstable state during the initialization phase. Once this initial biasing has been carried out, the successive test resets are performed. The same tests are then carried out by biasing the cells to the other state.

According to another variation, the mask or the map excludes part of the bits at the periphery of the memory plane. Indeed, peripheral bits are the most sensitive to drifts generated by lithography. They thus are the most likely to develop a bias and thus to lose the equiprobability from one circuit to the other.

According to a second aspect, illustrated by dotted lines in FIG. 6, the bit selection (map 41) is updated during the lifetime of the product if a memory cell becomes unstable. To achieve this, in case an error is corrected by code 43, the bits that it has received are used to determine which memory cell has switched state with respect to the creation of the map. The map code and the mask are then modified to select another bit which has the same value as the lost bit.

Figure 7:
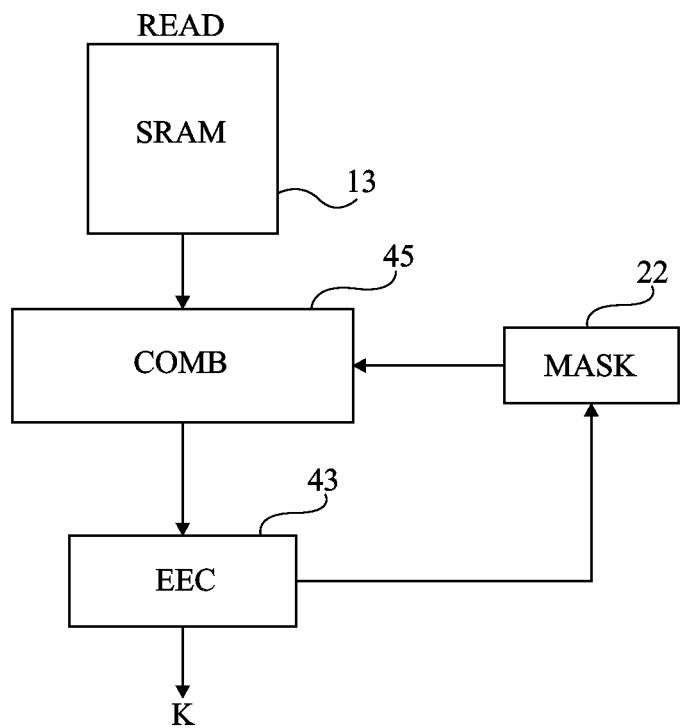
FIG. 7 is a block diagram illustrating another implementation mode of the key extraction method.

FIG. 7 is a block diagram illustrating an embodiment of a key extraction according to the second aspect alone.

All or part of memory 13 is read from (READ) and then submitted to a combination with a mask 22. This step may correspond to a selection of the cells read according to mask 22. Then, the result is submitted to an error-correction code 43 which provides key K. When errors are corrected, the corresponding memory bits are excluded from the subsequent selection process. This is illustrated by a modification of mask 22.

It is preferably considered that a bit becomes unstable as soon as the error-correction code has to perform a correction. For example, if an error-correction code of majority vote type is used by taking 3 memory bits to code a bit taken into account by the combiner, as soon as one of the three bits has a state different from the two others, this bit is considered to have become unstable. The error-correction code then informs that the erroneous bit of the three bits should be removed from map 41 and replaced by another one.

If the error-correction code is more resistant, for example, a 5-bit majority-vote code, two bits out of the five can be required to provide a result different from the others to modify the map.

Of course, other error-correction codes may be used, for example, using the Hamming codes or other functions of a combination of the bits.

The second aspect may be implemented independently from the first one, for example, by using usual extraction methods and correction codes.

If the two aspects are combined, then the number of bits taken into account for the key generation may be smaller than the total number of stable bits determined in the map, to be able to replace the bits that become unstable.

Various embodiments have been described. Various alterations and modifications will occur to those skilled in the art. In particular, the stable bit selection map and the mask of selection during the generation may be gathered in a single stable bit selection mask in the memory plane. In this case, the mask cannot come from outside of the integrated circuit but should be stored in its non-volatile memory. Further, this requires the key to be set during the tests and thus excludes, if the key has to be selected at a given value, dissociating the map generation phase from the key selection phase.

Moreover, although reference has been made to the extraction of a key, it should be understood that the described embodiments can be transposed to the extraction of several keys, for example, by using several masks for applications of challenge/response type.

Finally, the practical implementation of the present invention is within the abilities of those skilled in the art based on the functional indications given hereabove, the different operations being performed under control of processing unit 11 or of another block, for example, block 2, then integrating the programmable logic of execution of the key extraction algorithm. The map in practice corresponds to all the cell addresses, these addresses being stored in the non-volatile memory and accessed by extraction function 2.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method of extraction of a key from a physical unclonable function using the states of cells of a volatile memory after a powering-on of this memory, wherein:

cells are read according to addresses stored in a non-volatile memory;

an error-correction code corrects the read states; and in case an error has been corrected, the address of the cell providing an erroneous state is replaced, in the non-volatile memory, with that of another cell providing the non-erroneous state, wherein the states extracted from the volatile memory are submitted to a mask to provide the key.

2. The method of claim 1, wherein the addresses are initially determined based on successive tests of the states provided by the memory cells to select stable cells.

3. The method of claim 1, wherein the cells providing said states are selected from a set of cells formed after a test phase in which successive readings from the memory are performed after successive power-on operations, the set comprising the cells having provided same states during these read operations.

4. The method of claim 3, wherein the addresses of the cells of the set are stored in a non-volatile memory.

5. The method of claim 3, wherein the set excludes bits at the periphery of the memory plane.

6. A method for extracting a key from memory cells of a volatile memory after powering on and before programming of the volatile memory, comprising:
   reading states of memory cells of the volatile memory based on a map containing addresses of stable cells of the volatile memory, wherein the map is stored in a non-volatile memory;
   applying an error-correction code to the states of the memory cells read from the volatile memory;
   if an error is corrected, updating the map by replacing an address of a memory cell providing an erroneous state with an address of another memory cell providing a non-erroneous state; and
   combining the states of the memory cells read from the volatile memory with a mask to provide the key.

7. A method for extraction of a key as defined in claim 6, wherein applying the error-correction code is performed after combining the memory cells read from the volatile memory with the mask.

8. A method for extracting a key as defined in claim 6, wherein applying the error-correction code is performed before combining the memory cells read from the volatile memory with the mask.

9. A method for extracting a key as defined in claim 6, further comprising determining addresses of stable cells of the volatile memory based on successive reading of the states provided by the memory cells.

10. A method for extracting a key as defined in claim 9, wherein determining addresses of stable memory cells includes reading the states provided by the memory cells after setting the memory cells to a specified state.

11. A method for extracting a key as defined in claim 6, wherein the map excludes memory cells at a periphery of the volatile memory.

12. A method for extracting a key as defined in claim 6, wherein, if an error is corrected, updating the mask to select another memory cell which provides a non-erroneous state.

13. A circuit for generating a key in an integrated circuit, comprising:
   a volatile memory having a plurality of memory cells;
   a non-volatile memory including a map containing addresses of stable cells of the volatile memory; and
   a key extraction circuit configured to:
      read states of the memory cells of the volatile memory based on the map;
      apply an error-correction code to the states of the memory cells read from the volatile memory;
      if an error is corrected, update the map by replacing an address of a memory cell that provides an erroneous state with an address of another memory cell that provides a non-erroneous state; and
      combine the states of the memory cells read from the volatile memory with a mask to provide the key.

14. A circuit for generating a key as defined in claim 13, wherein the map excludes memory cells at a periphery of the volatile memory.

15. A circuit for generating a key as defined in claim 13, wherein the key extraction circuit is further configured to, if an error is corrected, update the mask to select another memory cell that provides a non-erroneous state.

* * * * *

UNITED STATES PATENT AND TRADEMARK OFFICE
CERTIFICATE OF CORRECTION

| | | |
|---|---|---|
| PATENT NO. | : 8,719,666 B2 | Page 1 of 1 |
| APPLICATION NO. | : 13/220453 | |
| DATED | : May 6, 2014 | |
| INVENTOR(S) | : Fabrice Marinet | |

It is certified that error appears in the above-identified patent and that said Letters Patent is hereby corrected as shown below:

\*\*In the Specification:

Column 3, line 3, delete the word "to".

Column 5, line 14, delete the letter "m".\*\*

Signed and Sealed this
Eighth Day of July, 2014

Michelle K. Lee
*Deputy Director of the United States Patent and Trademark Office*